July 20, 1926.

W. K. EARLE

VEHICLE BUMPER

Filed Oct. 31, 1921

1,593,118

INVENTOR:
WILLIAM K. EARLE,
BY Graham Harris
Attorneys.

Patented July 20, 1926.

1,593,118

UNITED STATES PATENT OFFICE.

WILLIAM K. EARLE, OF LOS ANGELES, CALIFORNIA.

VEHICLE BUMPER.

Application filed October 31, 1921. Serial No. 511,923.

It is generally conceded that an entirely efficient bumper must have the following qualifications: There must be provided sufficient strength to withstand the effects of shocks ordinarily encountered due to minor collisions, such as occur in driving through heavy traffic; the guard or cross bar must be resiliently mounted to provide for the absorption of shocks that are ordinarily applied thereto so that such shocks will not be transmitted in their fullness to the body of the vehicle upon which the bumper is mounted; and the resilient element should be of sufficient strength to cause the movement of the vehicle upon which the bumper is mounted when a force is exerted against any part thereof.

There are several types of bumpers now upon the market, each embodying certain of the desirable characteristics mentioned above.

The simple type of bumper, consisting essentially of a guard rod mounted upon the vehicle by means of brackets, may be made sufficiently strong to resist ordinary shocks, but has the disadvantage of transferring any shocks applied thereto directly to the chassis of the vehicle. A further disadvantage of this type is that in case the guard member is bent, due to a collision, the chassis extensions are drawn inwardly out of alinement, causing severe strains to be placed upon the structure of the car.

Another type of bumper now in extensive use, consists of a guard bar, such as mentioned above, mounted upon the chassis of a vehicle by gooseneck springs which serve to cushion the shocks applied to the bumper in their transfer to the body of the car. Although this type of bumper is superior to the one mentioned above, a serious disadvantage still remains in the lack of strength in the spring mounting causing an inability to resist heavy shocks, with the result that frequent repair to the bumper is necessary.

The most successful type of bumper now being used consists of a resilient cross bar mounted by suitable brackets upon the chassis of an automobile, this cross bar being in some instances formed of several layers of spring steel, and in other instances, consisting of an elongated loop of resilient metal. This type of bumper, while having considerable resiliency, cannot be constructed to stand up under severe shocks as a force of sufficient intensity to cause the movement of the car applied thereagainst generally results in the permanent deformation of the guard member because of the lack of concentration of strength in the resilient members thereof.

It is an object of my invention to provide a bumper that will be of sufficient strength to withstand the ordinary shocks applied thereto, due to minor collisions which are sometimes unavoidable in heavy traffic.

It is a further object of my invention to provide a bumper which may be sturdily constructed without detracting from the appearance of the automobile on which it is installed.

It is a further object of my invention to provide a bumper that will be of such strength that the automobile on which it is in use may be moved by the application of force against the bumper without causing injury thereto.

It is a still further object of my invention to provide a bumper that may be economically constructed owing to the efficient distribution of the resilient elements thereof.

Other objects and advantages will appear hereinafter from the following specification and drawings.

Referring to the drawings, which are for illustrative purposes only,

Figure 1:
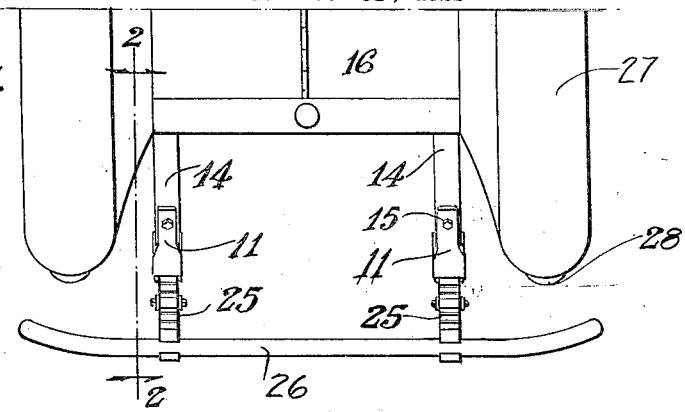
Fig. 1 is a plan view of the forward portion of an automobile showing a bumper embodying my invention mounted thereon.
Figure 2:
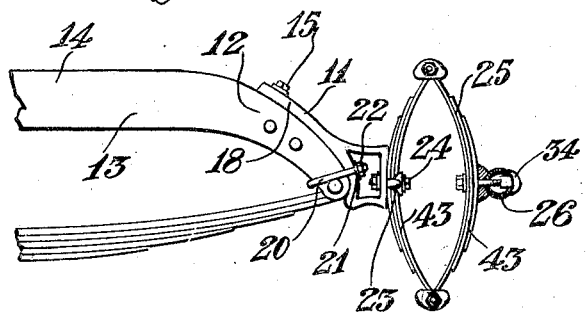
Fig. 2 is a view taken substantially upon a plane represented by the line 2—2, Fig. 1.
Figure 3:
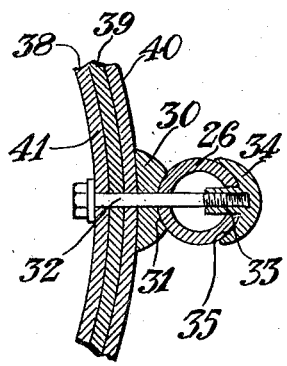
Fig. 3 is an enlarged detail illustrating the manner in which the guard rod is mounted upon the spring mounting of the bumper.

In the practice of my invention, I mount brackets 11 upon the horns 12 provided by the extensions 13 of the longitudinal members 14 of the chassis structure of an automobile 16. The brackets 11 may be suitably attached to the horn 12 by cap screws 15 extending through the plate extensions 18 of the brackets and by U-bolts 20 which extend through plate 21, as shown in Fig. 2, and having nuts 22 threaded thereupon, as further shown. Upon each of the brackets 11, I mount an elliptical spring 25 by means of flattened U-bolts 23 through which are extended bolts 24, preferably in the vertical position illustrated in the drawings, etc. Across the springs 25, I mount a tubular guard member 26 which is of sufficient length to extend entirely across the width of the automobile, as illustrated in Fig. 1, so that the fenders 27 and the tires 28 will be protected thereby.

The form of mounting I use to secure the guard 26 upon the spring 25 consists of a saddle plate 30 suitably recessed at 31 to accommodate the contour of the guard 26, and having extended therethrough a screw 32 which threads into a projecting lug 33 of a cap member 34 which is also formed to adhere to the contour of the guard 26, as shown at 35. The screw 32 also extends through the leaves 38, 39 and 40 of the outer half 41 of the spring 25 and serves to secure the entire outer structure of the spring together.

Figures 4, 5:
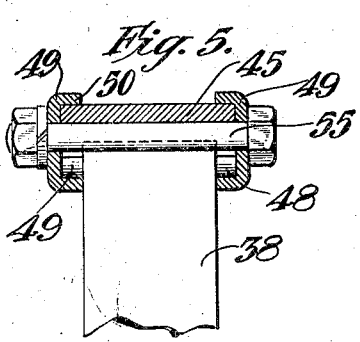
Fig. 4 is an enlarged sectional view illustrating the manner in which the ends of the spring members are secured together.
Fig. 5 is a section taken on the plane represented by the line 5—5, Fig. 4.

The number of leaves from which the spring 25 is formed may be selected to suit the weight of car upon which the bumper is to be mounted, and also the severity of conditions under which the car is operated. The outer section 41 of the spring 25 is secured to the inner section 43 thereof by means comprising spring clips 45 bent to the shape indicated in Fig. 4, and adapted to enclose the juxtaposed outwardly hooked ends 46 of the primary leaves 38 of the sections 41 and 43, over which hooked ends 46 the clips are forced, holding them tightly together. The clips 45 are adapted to extend slightly beyond the confines of the leaves 38, as indicated at 48, the ends thereof being covered by caps 49 shown as cupped having inwardly turned edges 50 surrounding the ends of the clips 45. A bolt 55 serving as a locking element extends through the cap 49 and through the clip 45, as shown in Fig. 4. It will be perceived that the bolt 55 is of such a diameter as to interfit within and substantially fill the space existing between the hooked ends 46 of the leaf springs 38 and the interior surface 60 of the clip 45, assisting therein in the formation of a compact and smoothly operating spring joint.

My invention combines the above mentioned qualifications necessary to the perfect functioning of a bumper, as the spring elements are inherently of great strength as well as having considerable resiliency to absorb shocks. These features are accomplished without detracting from the general appearance of the automobile upon which the bumper is mounted.

I claim as my invention:

1. In a bumper as disclosed: a pair of vertically extending elliptical springs; means for rigidly mounting the rear sections of said springs on the forward end of an automobile; a rigid guard extending across the front sections of said springs; means for securing said guard to said front sections; the ends of said spring sections being hook-shaped; and securing means for said ends comprising: a clip which contacts exteriorly with said ends, separate cupped caps extending over and surrounding opposite ends of said clip, and a locking element retaining said caps and interfitting between said ends and the interior of said clip.

2. In a spring organization comprising a plurality of leaf springs having ends in juxtaposition, securing means for said ends comprising a clip contacting exteriorly with said spring ends, separate cupped caps extending over and surrounding opposite ends of said clip, and a locking element retaining said caps and interfitting between said spring ends and the interior of said clip.

In testimony whereof, I have hereunto set my hand at Los Angeles, California, this 24th day of October, 1921.

WILLIAM K. EARLE.